United States Patent
Aratani et al.

(10) Patent No.: US 6,236,441 B1
(45) Date of Patent: May 22, 2001

(54) LIQUID CRYSTAL DISPLAY APPARATUS AND A METHOD FOR MANUFACTURING THE SAME

(75) Inventors: Sukekazu Aratani; Yoshiyuki Umeda; Hiroyuki Kagawa; Hisao Yokokura, all of Hitachi; Katsumi Kondo, Hitachinaka; Shigeru Matsuyama; Masahito Oh-e, both of Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/388,446

(22) Filed: Sep. 2, 1999

Related U.S. Application Data

(63) Continuation of application No. 08/720,417, filed on Sep. 30, 1996.

(30) Foreign Application Priority Data

Oct. 12, 1995 (JP) .................................................. 7-263859

(51) Int. Cl.[7] ............................ G02F 1/139; G02F 1/1333
(52) U.S. Cl. ............................. 349/141; 349/106; 349/122
(58) Field of Search .................................... 349/122, 106, 349/141, 42, 138

(56) References Cited

U.S. PATENT DOCUMENTS

| 4,345,249 | 8/1982 | Togashi . | |
|---|---|---|---|
| 4,728,176 | 3/1988 | Tsubayama et al. . | |
| 5,042,920 | 8/1991 | Yoshino et al. . | |
| 5,132,816 | 7/1992 | Itoh et al. . | |
| 5,585,951 | * 12/1996 | Noda et al. | 349/122 |
| 5,598,285 | 1/1997 | Kondo et al. . | |
| 5,600,464 | 2/1997 | Ohe et al. . | |
| 5,641,974 | 6/1997 | den Boer et al. . | |
| 5,818,550 | * 10/1998 | Kadota et al. | 349/122 |

FOREIGN PATENT DOCUMENTS

| 63-21907 | 5/1988 | (JP) . |
| 6-160878 | 6/1994 | (JP) . |
| 6-222397 | 8/1994 | (JP) . |
| WO 91/10936 | 7/1991 | (WO) . |

* cited by examiner

Primary Examiner—Kenneth Parker
Assistant Examiner—Tai V. Duong
(74) Attorney, Agent, or Firm—Antonelli, Terry, Stout & Kraus, LLP

(57) ABSTRACT

A liquid crystal display apparatus and a method of manufacturing wherein the liquid crystal display apparatus includes a pair of substrates, a liquid crystal layer interposed between the pair of substrates, plural electrodes formed on at least one of the pair of substrates, a passivation layer formed on the plural electrodes and having concave portions, a thin film having low wettability formed on the passivation layer, and an insulating layer formed on the thin film having low wettability. The method includes the steps of irradiating light onto the thin film through a mask, and applying a solution containing organic high polymers so as to form the insulating layer at the concave portions of the passivation layer.

8 Claims, 5 Drawing Sheets

FIG.3
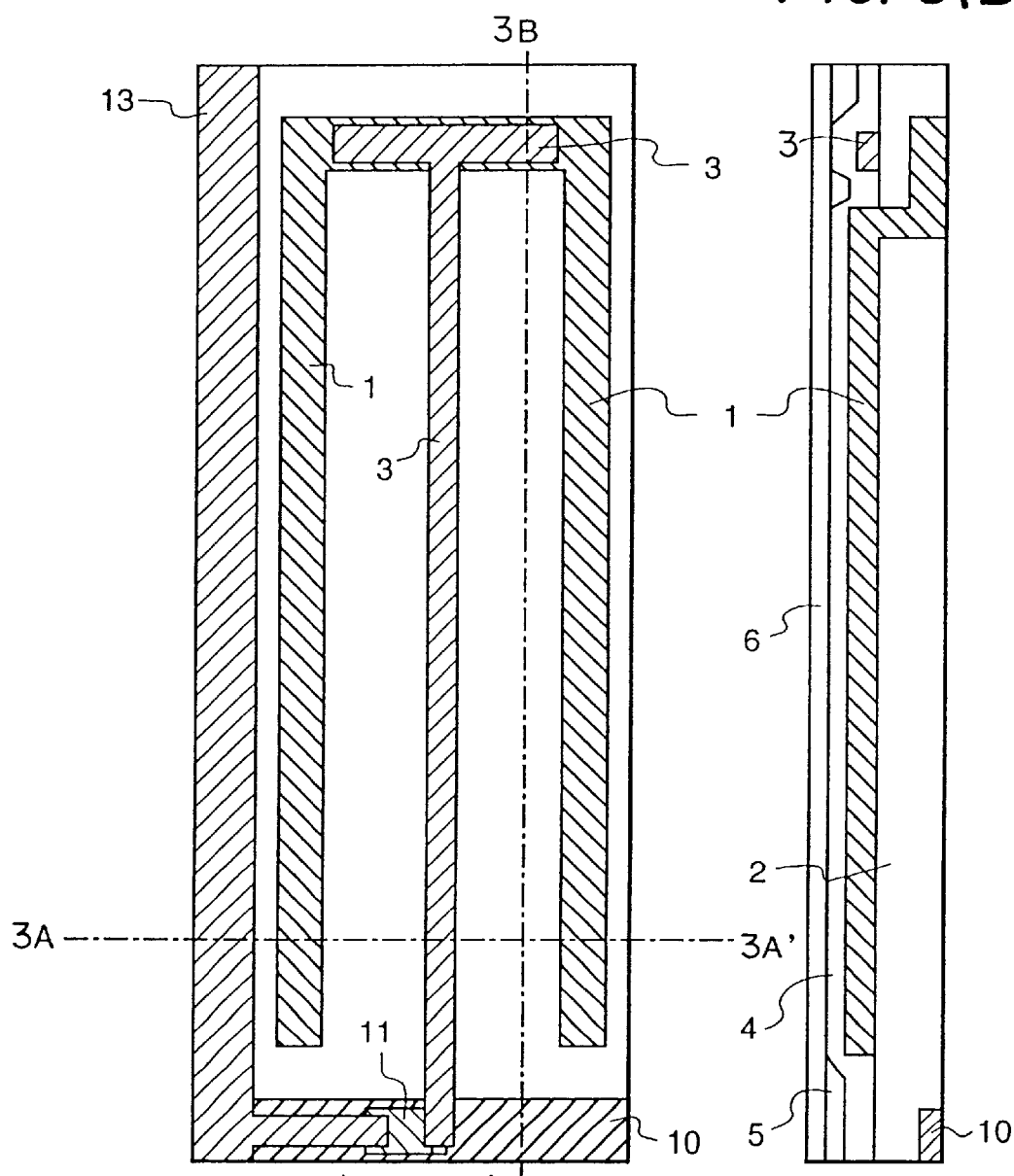
FIG. 3(B)
FIG. 3(A)
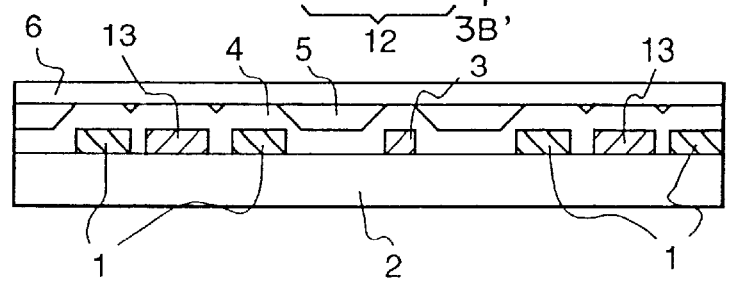

FIG.4
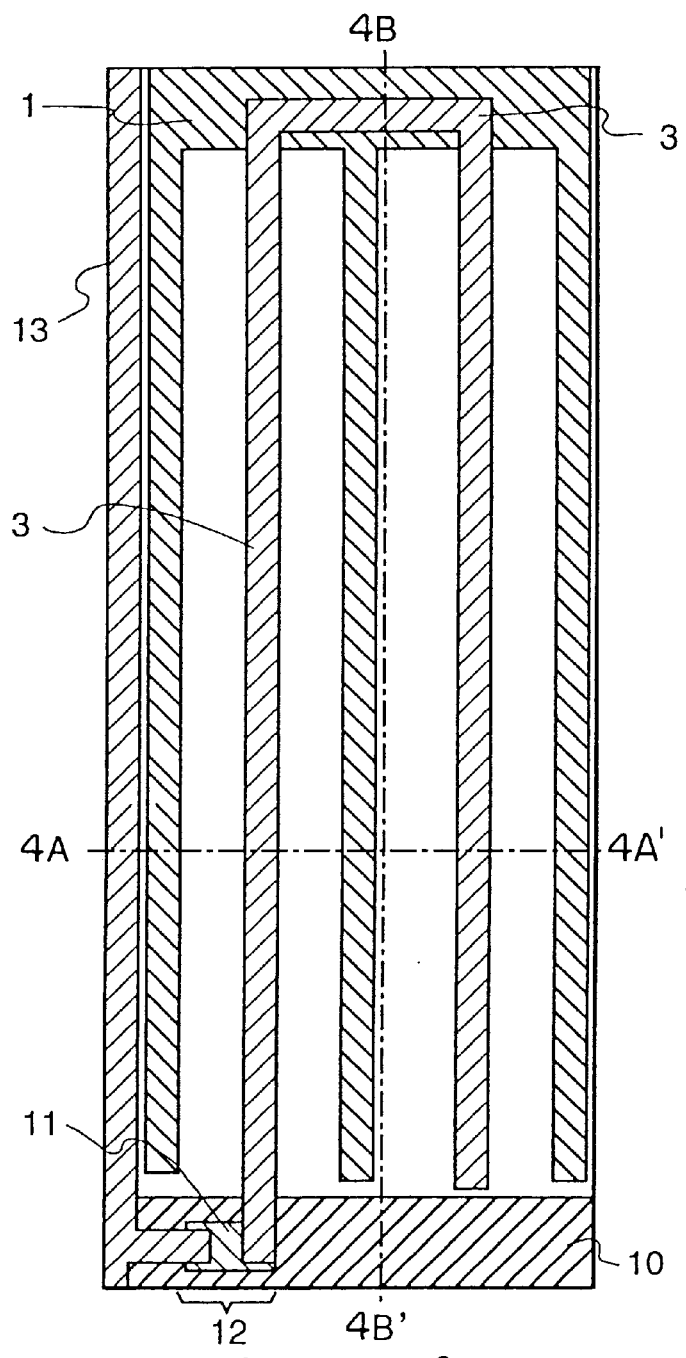
FIG. 4(B)
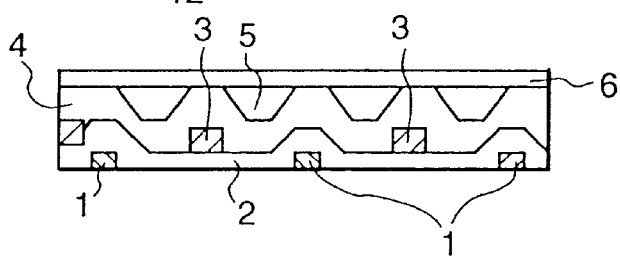
FIG. 4(A)

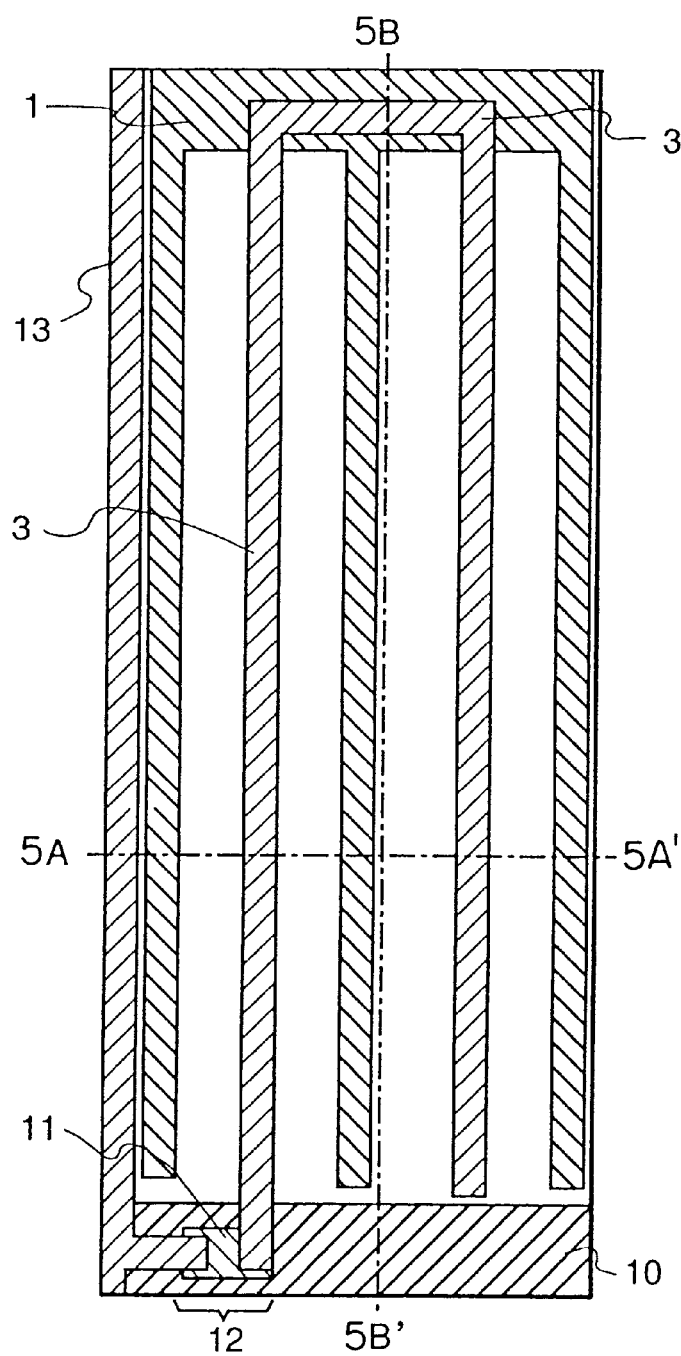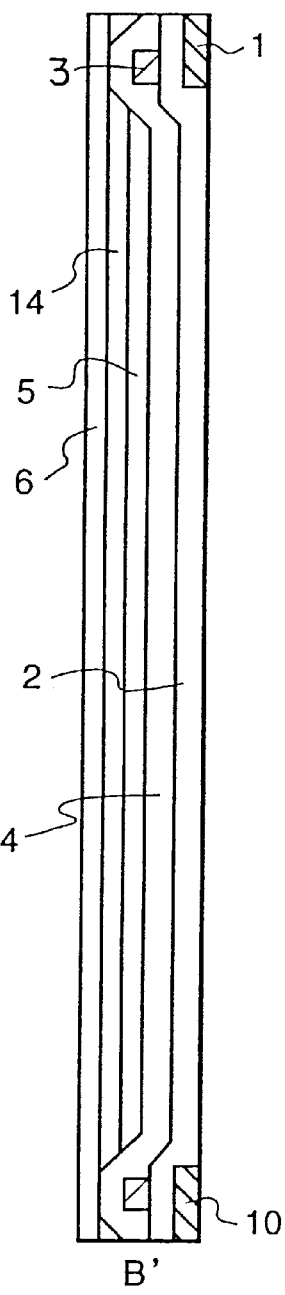
FIG.5
FIG. 5(B)
FIG. 5(A)

FIG. 6
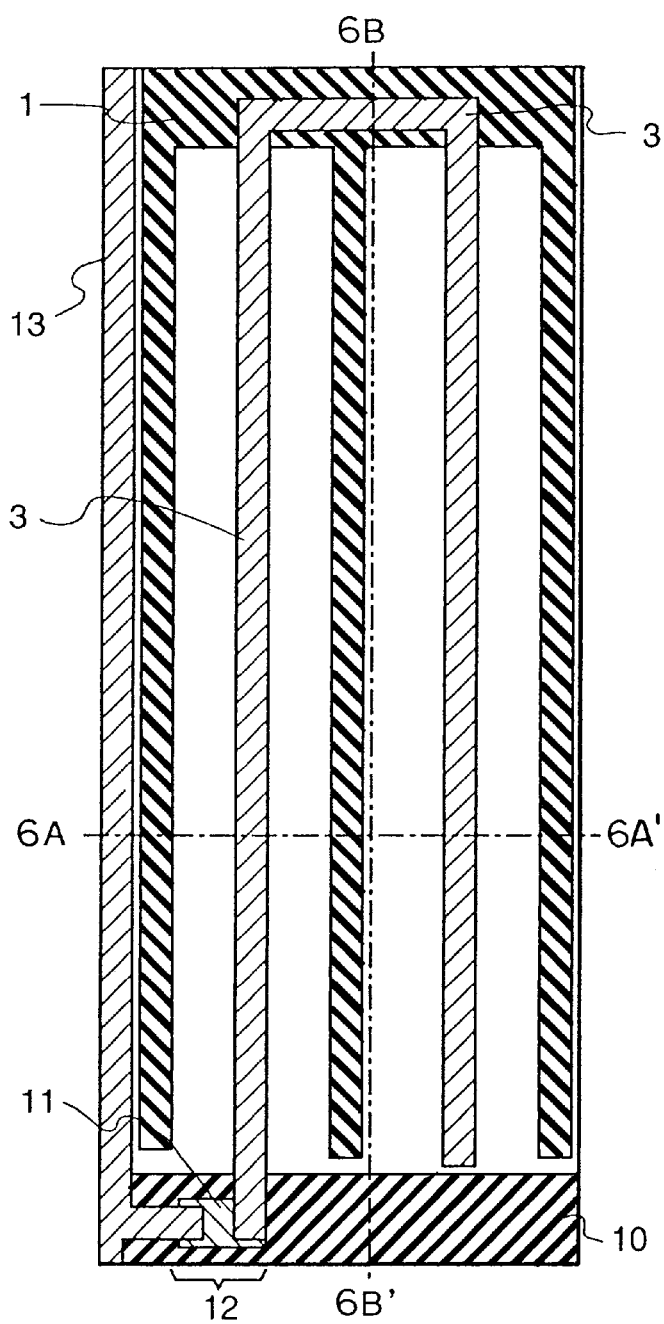
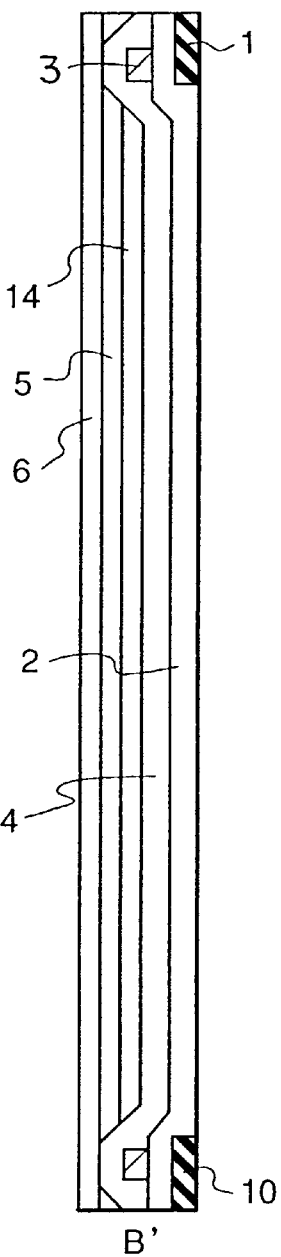
FIG. 6(B)
FIG. 6(A)

LIQUID CRYSTAL DISPLAY APPARATUS AND A METHOD FOR MANUFACTURING THE SAME

CROSS REFERENCE TO RELATED APPLICATION

This is a continuation of U.S. application Ser. No. 08/720,417, filed Sep. 30, 1996, still pending the subject matter of which is incorporated by reference herein.

BACKGROUND OF THE INVENTION

The present invention relates to liquid crystal display apparatus.

A display method, wherein an electric field is supplied to a liquid crystal in a direction approximately parallel to the surface of a substrate using a pair of comb-shaped electrodes, has been disclosed in JP-B-63-21907 (1988), U.S. Pat. No. 4,345,249, W091/10936, JP-A-6-222397 (1994), and JP-A-6-160878 (1994). In this type of display method, the electrode is not required to be transparent, and so an opaque metallic electrode having a high electro-conductivity is used.

The display method disclosed in the above-referenced prior art, i.e. the display method wherein an electric field is supplied to a liquid crystal in a direction approximately parallel to the surface of a substrate (hereinafter called an in-plane switching method), has the feature of providing a wide viewing angle. However, none of the prior art teaches how to make a high contrast ratio and a decreased nonuniformity of display compatible.

In accordance with the in-plane switching method, the electric field is supplied in a direction approximately parallel to the surface of the substrate. Therefore, in contrast to the conventional twisted nematic display method, the driving voltage depends on the cell gap, and the threshold voltage, Ec, is approximately expressed by the following equation (math. 1).

$$Ec = \frac{\pi}{d_{LC}} \sqrt{\frac{K_2}{\varepsilon_0 \Delta \varepsilon}} \qquad \text{(math. 1)}$$

where, $d_{LC}$: Cell gap $K_2$: Elastic constant of twist of the liquid crystal $\Delta \varepsilon$: Dielectric anisotropy of the liquid crystal $\varepsilon_0$: Dielectric constant in vacuum Investigation by the present inventors has revealed that, in accordance with the in-plane switching method, the driving voltage depends on the cell gap, and accordingly, variation of the cell gap in the display plane is readily expressed as a variation of the surface brightness, and nonuniformity of display occurs readily. The term nonuniformity of display refers to a nonuniformity in brightness caused by variation of the cell gaps.

If the dispersing amount of the spacer beads is increased as a countermeasure against the nonuniformity of display, the nonuniformity of display can be decreased by an increase in the amount of the spacer beads, which contributes to formation of the cell gap. However, it also has been revealed that a leakage of light caused by variation in the liquid crystal orientation in the vicinity of the spacer beads is increased with an increase in the amount of the spacer beads at an aperture portion of the display, creating the problem that the contrast is decreased.

If a planarization film composed of organic high polymers is formed as another countermeasure on the whole surface of a substrate having a group of electrodes, the nonuniformity of display can be decreased with a decrease of the surface nonuniformity. However, it also has been revealed that the contrast ratio is decreased because the driving voltage is increased, and so a problem arises in that a sufficient voltage can not be supplied to the liquid crystal.

SUMMARY OF THE INVENTION

The object of the present invention is to provide a liquid crystal display apparatus having a wide viewing angle, a high contrast ratio, and a small nonuniformity of display, and a method for manufacturing the same.

The liquid crystal display apparatus relating to the present invention comprises a pair of substrates, and a liquid crystal layer interposed between the pair of substrates, wherein at least one substrate of the pair of substrates comprises a plurality of electrodes, a passivation film formed on the plurality of electrodes, and an insulating layer formed at concave portions on the passivation layer for making the thickness of the liquid crystal layer uniform. The variation in the thickness of the liquid crystal layer is preferably at the utmost 0.3 µm.

Furthermore, another form of the liquid crystal display apparatus relating to the present invention comprises a pair of substrates, and a liquid crystal layer interposed between the pair of substrates, wherein at least one substrate of the pair of substrates comprises a plurality of electrodes, a passivation film formed on the plurality of electrodes, and an insulating layer formed on the passivation layer, wherein the thickness of the insulating layer in regions other than a region on the electrodes is made larger than the thickness of the passivation layer in the region on the electrodes.

The size of the light leakage region varies depending on whether the spacer beads contribute to the formation of the gap or not. The light leakage around the spacer beads contributing to the formation of the gap is remarkably small in comparison with the light leakage around the spacer beads which do not contribute to the formation of the gap. With a view toward making the thickness of the liquid crystal layer uniform, the dispersing amount of the spacer beads can be decreased, whereby the light leakage around the spacer beads becomes small because almost all of the spacer beads can contribute to the formation of the gap. Accordingly, a decrease in contrast due to light leakage around the spacer beads is prevented, and the nonuniformity of display can be decreased.

The advantages of the present invention are remarkable in the use of the in-plane switching method. In comparison with twisted nematic display methods, the in-plane switching method has a feature to reveal readily the variation in the cell gap as a variation of the surface brightness because the driving voltage depends on the cell gap.

BRIEF DESCRIPTION OF THE DRAWINGS

These and other objects, features and advantages of the present invention will be understood more clearly from the following detailed description with reference to the accompanying drawings, wherein:

FIG. 3 is a plan view of a unit pixel of a liquid crystal display apparatus relating to the present invention, FIG. 3(A) is a sectional view taken along line 3A–3A' and FIG. 3(B) is a sectional view taken along line 3B–3B' in FIG. 3;

FIG. 4 is a plan view of another unit pixel of a liquid crystal display apparatus relating to the present invention, FIG. 4(A) is a sectional view taken along line 4A–4A' and FIG. 4(B) is a sectional view taken along line 4B–4B' in FIG. 4;

FIG. 5 is a plan view of another unit pixel of a liquid crystal display apparatus relating to the present invention, FIG. 5(A) is a sectional view taken along line 5A–5A' and FIG. 5(B) is a sectional view taken along line 5B–5B' in FIG. 5.

FIG. 6 is a plan view of another unit pixel of a liquid crystal display apparatus relating to the present invention, FIG. 6(A) is a sectional view taken alone line 6A–6A' and FIG. 6(B) is a sectional view taken alone line 6B–6B' in FIG. 6.

DESCRIPTION OF THE PREFERRED EMBODIMENTS

Hereinafter, an embodiment of the present invention will be explained with reference to the drawings.

Figure 1:
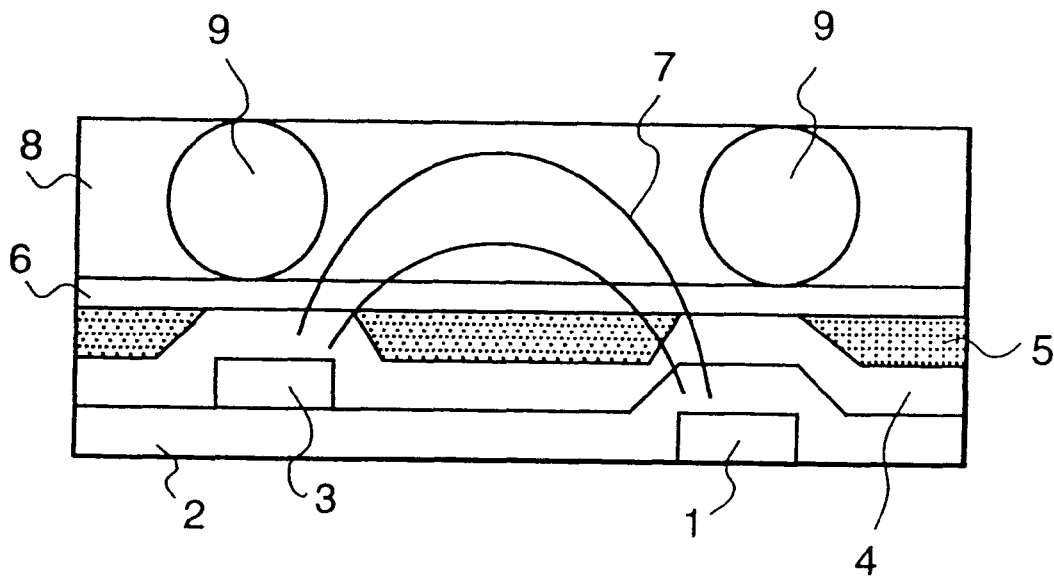
FIG. 1 is a schematic illustration of an example of the liquid crystal display apparatus relating to the present invention.
Figure 2:
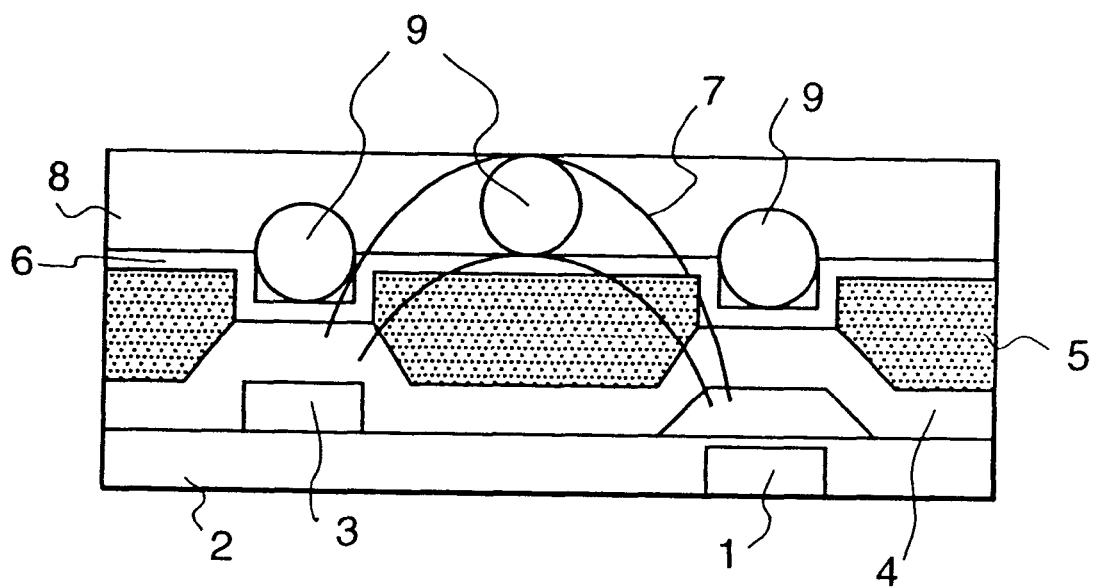
FIG. 2 is a schematic illustration of another example of the liquid crystal display apparatus relating to the present invention.

An example of the liquid crystal display apparatus of the present invention is illustrated in FIG. 1. Even if electrodes are arranged so that an electric field is supplied in a direction parallel to the surface of the substrate, the electric field 7 actually supplied to the liquid crystal layer 8 extends as shown in FIG. 1 and is supplied to the liquid crystal. Therefore, if an insulating layer 5 exists on the electrodes, the insulating layer 5 operates to weaken the electric field supplied to the liquid crystal 8. Thus, in accordance with the present invention, no insulating layer exists on the electrodes, and so the electric field supplied to the liquid crystal is not weakened. Accordingly, an increase in the driving voltage is not significant. In the case where planarization is realized in the manner provided by the present invention, almost all of the dispersed spacer beads 9 contribute to the formation of the gap, and a smaller amount of the dispersed spacer beads than in a case where the flattening is not realized can be sufficient for improving the preciseness of the gap. As shown in FIG. 1, the insulation layer 5 has a thickness delimited by a distance between a first or lower surface of the insulation layer disposed at a first position with respect to a surface of the substrate 2 and a second or upper surface of the insulation layer disposed at a second position which is positioned farther away than the first or lower surface of the insulation layer from a surface of the substrate 2. Additionally, as shown, the second or upper surface of the insulation layer at the second position is disposed at a distance from the surface of the substrate 2 in the regions between the plural electrodes 1 and 3 which is at least substantially equal to a distance between the same surface of the substrate 2 and a first or upper surface of the passivation layer 4 which is disposed farther away from the surface of the substrate 2 in the regions directly over the plural electrodes than a second or lower surface of the passivation layer 4 in the regions directly over the plural electrodes. However, as shown in FIG. 2, the second or upper surface of the insulation layer 5 at the second position is disposed at a distance which is greater than the distance between the surface of the substrate 2 and the first or upper surface of the passivation layer in the regions directly over the plural electrodes. Further, as shown in FIGS. 1 and 2, in regions other than regions on or directly over the plural electrodes any surface level of the insulation layer 5 is always higher than any surface level of the passivation layer 4. Additionally, the substrate 2 has a first or lower surface and a second or upper surface, the first or lower surface, as shown, being disposed further away from the second or lower surface of the passivation layer than the first and upper surface of the substrate 2.

Another example of the liquid crystal display apparatus of the present invention is illustrated in FIG. 2. In this example, only the spacer beads on the aperture portion can contribute to the formation of the gap, because the top of the aperture portion is higher than the other portions. Accordingly, in comparison with the case where most of the spacer beads contribute to formation of the gap, the dispersing amount of the spacer beads must be increased. However, all of the spacer beads which do not contribute to the formation of the gap are located on the electrodes, and are shielded from light by the electrodes. The spacer beads, which contribute to the formation of the gap, do not decrease the contrast so much because light leakage around the beads is small. Therefore, even if the dispersing amount of the spacer beads is increased, any decrease in the contrast due to light leakage around the beads is small, and so the nonuniformity of display can be decreased.

The structure of an electrode in a unit pixel of the liquid crystal display apparatus relating to the present invention is illustrated in FIG. 3. In forming the structure, a gate bus-line 10 was formed on a glass substrate, and the surface of the gate bus-line 10 was coated with an alumina film. A SiN (gate SiN) film 2 and an amorphous Si (a-Si) film 11, which are gate insulating layers, were formed so as to cover the gate bus-line 10, and a pixel electrode 3 and a source bus-line 13 were formed on the a-Si film 11. In accordance with this procedure, a transistor element 12 was formed. Further, a counter or common electrode 1 was formed in the same layer as the pixel electrode 3 and the source bus-line 13, so that an electric field could be supplied between the pixel electrode 3 and the counter or common electrode 1, the direction of the electric field being almost parallel to the surface of the substrate. The number of the pixels was 640 (X3) X480, and the pitches of the pixels were 100 μm in the lateral direction (i.e. between counter electrodes) and 300 μm in the vertical direction (i.e. between gate bus-lines).

Color filters of three primary colors, R, G, and B in a stripe shape were provided on a counter substrate facing the substrate having the transistor element. An over coating layer for planarizing the surface of the color filters was formed with a transparent resin on the color filters. An epoxy resin was used as the material of the transparent resin. Furthermore, an alignment layer was formed on the transparent resin by applying a polyimide group resin thereto.

The directions of rubbing of the upper and lower substrates were approximately in parallel to each other, and the angle formed with the direction of the supplied electric field was 75 degrees. The thickness of the liquid crystal layer (the cell gap) d was maintained by inserting spherical polymer beads dispersed between the substrates with a dispersed density of 100 beads/mm$^2$ to be 6.5 μm in a liquid crystal enclosed condition. The pressure added to the upper and lower substrates, which were overlapped for forming the cell gap, was 0.3 kgf/cm$^2$. The panel was interposed between two polarizers, the transmission axis of polarized light of one of the polarizers was set in an approximately parallel direction to the rubbing direction, and the transmission axis of polarized light of the other polarizer was set in an orthogonal direction to the rubbing direction. Accordingly, negative contrast display characteristics could be obtained. A liquid crystal having a positive dielectric anisotropy was held between the substrates. A passivation layer 4 was formed with SiN to be approximately 0.3 µm thick. An insulating layer 5 was formed with a photosensitive epoxy resin by applying a solution containing the epoxy resin, irradiating it with ultraviolet light by rear exposure, and curing the epoxy resin at only the exposed position.

A polyimide alignment layer was used for the alignment layer 6. Further, the insulating layer 5 can be used as the alignment layer. The variation in the cell gap (thickness of the liquid crystal layer) was within 0.20 µm. The contrast ratios of the panel manufactured in the manner as described above were determined by measuring light transmittances under a condition with no supplied voltage (a dark state) and a condition with a supplied voltage of 10 V in a region between the counter electrode 1 and the pixel electrode 3 (including regions on both the electrodes) and by calculating the contrast ratio from ratios of the light transmittances. An average contrast ratio of the panel obtained by measurement of the ratios of light transmittances at 20 portions of the panel was 80.

Next, the nonuniformity of display of the panel was evaluated by visual inspection. The display produced by the panel was observed under a condition in which a 5 V alternating voltage was supplied, and was ranked in accordance with the observed nonuniformity in five grades, i.e. level 5 when complete uniformity in display was observed, level 4 when nonuniformity was hardly observed, level 3 when a little nonuniformity was observed, level 2 when fairly significant nonuniformity was observed, and level 1 when entire nonuniformity was observed. As a result, the panel manufactured in the manner as described above was evaluated as at level 4.

Another structure of the electrode in a unit pixel of the liquid crystal display apparatus relating to the present invention is illustrated in FIG. 4. A gate bus-line 10 and a counter electrode 1 were formed on a polished glass substrate, and the surface of the gate bus-line 10 was coated with an alumina film. A gate insulating (gate SiN) film 2 was formed so as to cover the gate bus-line 10 and the counter electrode 1. Subsequently, an amorphous Si (a-Si) film 11 with a n-type a-Si film thereon were formed. Furthermore, a pixel electrode 3 and an source bus-line 13 were formed. Therefore, the pixel electrode 3 and the counter electrode 1 were located respectively in separate layers. By locating respective ones of the two electrodes in separate layers, various structures of the electrodes can be utilized, and the pixel electrode 3 and the-counter electrode 1 can operate as capacitance elements. However, the nonuniformity of the passivation layer surface becomes larger than the case illustrated in FIG. 3, and the planarization of the passivation layer becomes important. A photosensitive polyimide resin was used for the insulating layer 5, and the thickness of the formed polyimide resin was 0.3 µm. A polyimide group alignment layer was used. The variation of the cell gap was within 0.15 µm. The contrast ratios of the panel manufactured in the manner as described above were determined by measuring light transmittances under a condition with a driving voltage of 0 V, and a condition with a driving voltage of 10 V, and an average contrast ratio of 100 was obtained for the panel. As a result of evaluating the nonuniformity of display, the level 4 was obtained.

The contrast ratios of the panels manufactured with polyimide films formed respectively to be 0.2 µm and 0.1 µm thick were respectively 80 and 60. The results of the evaluation on the nonuniformity of display were, respectively, the level 4 and the level 2. Variation of the cell gaps were, respectively, within 0.19 µm and 0.25 µm.

When the insulating layer was eliminated, the contrast ratio of the manufactured panel became 40. The nonuniformity of display was evaluated as the level 2. Variation of the cell gap was within 0.42 µm.

The contrast ratio of the panel manufactured with an insulating layer having a thickness of 0.1 µm and with spacer beads, of which the dispersing density was 200 beads/mm$^2$, was approximately 30. The variation of the cell gap was within 0.30 µm. The nonuniformity of display was evaluated as the level 4. As explained above, the nonuniformity of display could be decreased by increasing the dispersing amount of the spacer beads. However, the contrast ratio decreased remarkably.

The contrast ratio of the panel manufactured with no insulating layer and with spacer beads having a dispersing density of 50 beads/mm$^2$ was 80. The variation of the cell gap was within 0.51 µm. The nonuniformity of display was evaluated as the level 1. As explained above, the contrast ratio could be increased by decreasing the dispersing amount of the spacer beads. However, the nonuniformity of display became significant.

Hereinafter, another method of forming an insulating layer will be explained.

Prior to forming the insulating layer, a soluble teflon having a low wettability film was formed on the entire plane by a spin coating method. Subsequently, the teflon film was irradiated with ultraviolet rays (wavelength: 315 nm, 1 W/cm$^2$) for five minutes through a mask. Then, an epoxy resin solution containing organic high polymers was applied by a spin coating method on the teflon film to form the insulating layer composed of epoxy resin at only the opening portion selectively. After irradiating the insulating layer with ultraviolet rays (wavelength: 315 nm, 1 W/cm$^2$) for five minutes, an alignment layer was formed thereon. The nonuniformity of the surface of the prepared substrate was 0.3 µm. The observed contrast ratio of the prepared panel was 80. The nonuniformity of display was evaluated as level 4.

An example of forming color filter layers on a TFT substrate is illustrated in FIG. 5. The insulating layer 5 was 0.4 µm thick. The color filter layers 14 were formed on the insulating layer. The observed contrast ratio of the prepared panel was 100. The nonuniformity of display was evaluated as level 5, i.e. a condition wherein complete uniformity was observed. When the color filter layers are formed in a manner as described above, position mismatch of a substrate with the counter substrate can be prevented, and the electric field supplied to the liquid crystal layer is not weakened and the driving voltage is not decreased because the color filter layers are not located on the electrode. Variation of the cell gap was within 0.10 µm.

Color liquid crystal display apparatus were manufactured with the panels prepared in the manner described above. The film thickness, surface nonuniformity of the alignment layers, observed contrast ratios, and results of evaluating the nonuniformity of display were as shown in Table 1. The contrast ratio and the nonuniformity of display were inferior if the cell gap was larger than 0.3 µm.

TABLE 1

| Experiment No. | Film Thickness of insulating layer | Variation of cell gap (μm) | Contrast ratio | Non-uniformity of display |
|---|---|---|---|---|
| 1 | 0.3 | 0.2 | 100 | 4 |
| 2 | 0.4 | 0.1 | 160 | 5 |
| 3 | 0.2 | 0.3 | 80 | 4 |
| 4 | 0.1 | 0.4 | 60 | 2 |
| 5 | 0 | 0.5 | 40 | 2 |

In accordance with the present invention, a liquid crystal display apparatus operating according to the in-plane switching method having a high contrast ratio and little nonuniformity of display can be provided.

FIG. 6 shows another embodiment of the present invention similar to FIG. 5 wherein the color filter layers 14 are formed between the passivation layer 4 and the insulating layer 5 at regions other than regions on the plural electrodes.

What is claimed is:

1. A liquid crystal display, comprising:
   a pair of substrates, and
   a liquid crystal layer interposed between said pair of substrates, wherein
   at least one of said pair of substrates comprises:
      pixel electrodes and common electrodes provided thereon,
      a passivation layer provided so as to overlie said pixel electrodes and said common electrodes, said passivation layer having concave portions, and
      color filters respectively provided on said concave portions of said passivation layer, and
      at least an insulating layer respectively provided on at least one of said passivation layer and said color filters.

2. A liquid crystal display according to claim 1, wherein said passivation layer is provided in direct contact with one of said pixel electrodes and said common electrodes.

3. A liquid crystal display according to claim 2, wherein said passivation layer is provided in direct contact with said pixel electrodes.

4. A liquid crystal display according to claim 1, wherein said pixel electrodes and said common electrodes are provided on said at least one of said pair of substrates so as to enable an electric field having a component extending substantially in parallel to said at least one of said pair of substrates to extend between at least one of said pixel electrodes and at least one of said common electrodes.

5. A liquid crystal display, comprising:
   a pair of substrates, and
   a liquid crystal layer interposed between said pair of substrates, wherein
   at least one of said pair of substrates comprises:
      pixel electrodes and common electrodes provided thereon;
      a passivation layer provided so as to overlie said pixel electrodes and said common electrodes, said passivation layer having concave portions; and
      color filters respectively provided on said concave portions of said passivation layer.

6. A liquid crystal display according to claim 5, wherein said passivation layer is provided in direct contact with one of said pixel electrodes and said common electrodes.

7. A liquid crystal display according to claim 6, wherein said passivation layer is provided in direct contact with said pixel electrodes.

8. A liquid crystal display according to claim 5, wherein said pixel electrodes and said common electrodes are provided on said at least one of said pair of substrates so as to enable an electric field having a component extending substantially in parallel to said at least one of said pair of substrates to extend between at least one of said pixel electrodes and at least one of said common electrodes.

* * * * *